No. 748,857. PATENTED JAN. 5, 1904.
R. J. GOADE.
FILTER.
APPLICATION FILED AUG. 24, 1903.
NO MODEL. 2 SHEETS—SHEET 1.
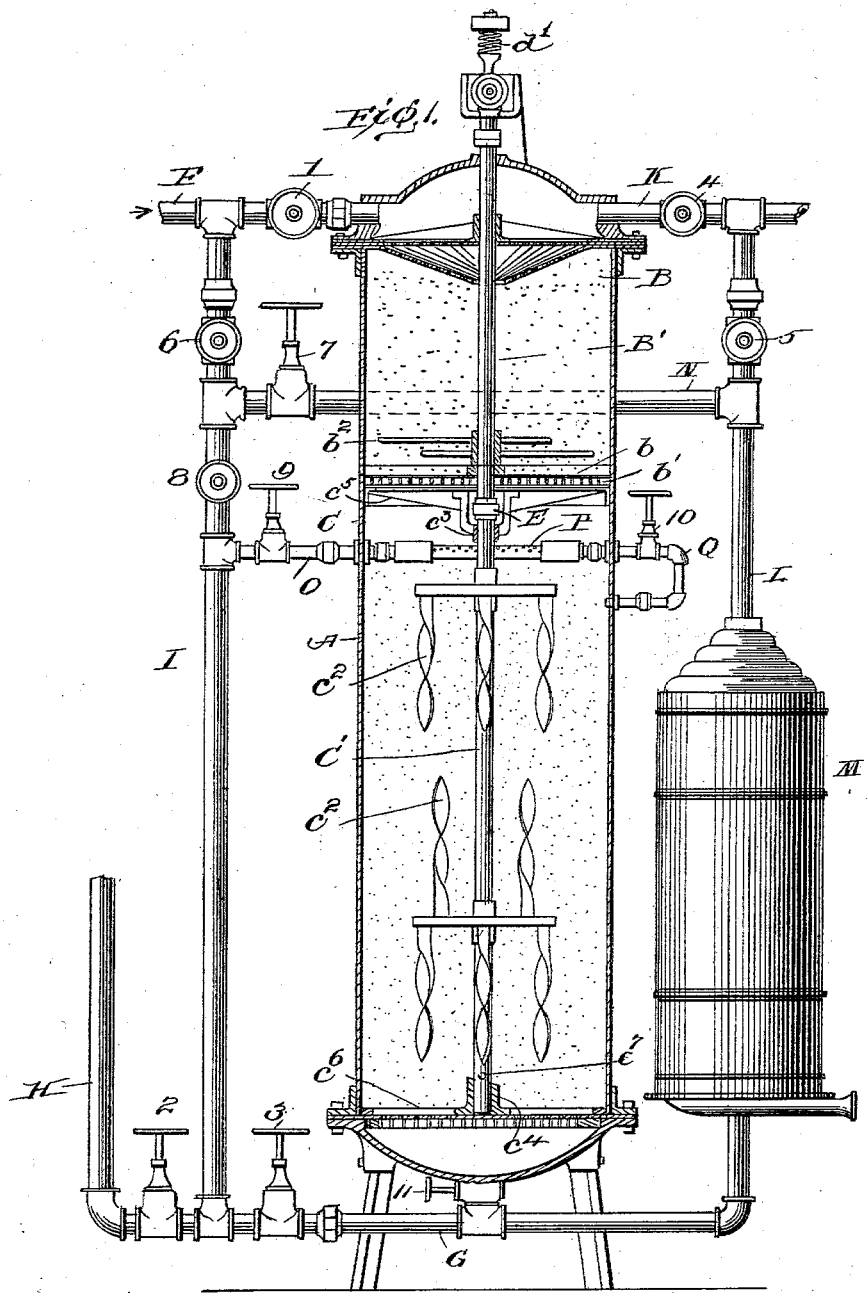
Witnesses
J. M. Fowler Jr.
Grace McFarlan
Inventor
Richard J. Goade,
By Spencer B. Prentis,
his Attorney No. 748,857. PATENTED JAN. 5, 1904.
R. J. GOADE.
FILTER.
APPLICATION FILED AUG. 24, 1903.
NO MODEL. 2 SHEETS—SHEET 2.
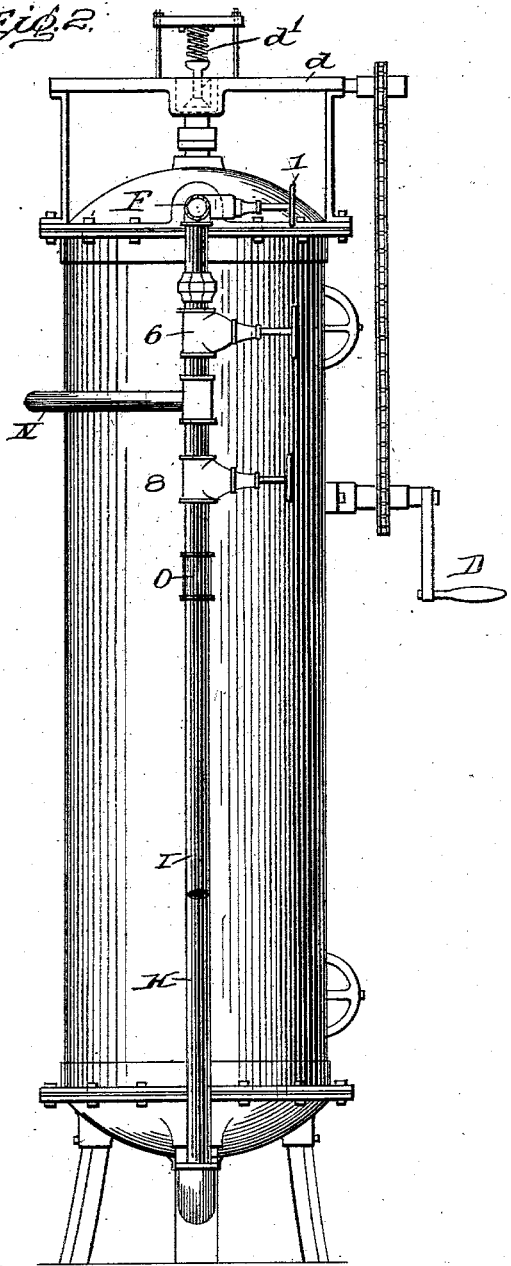
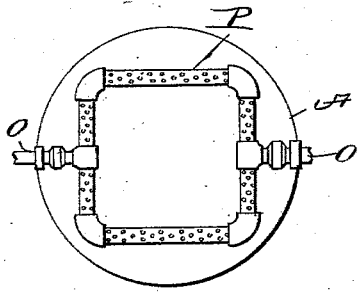
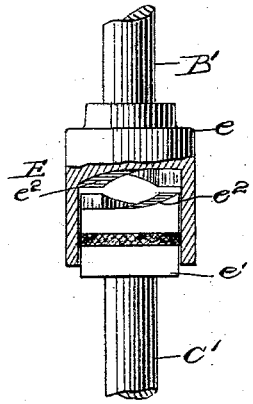
WITNESSES:
INVENTOR:
Richard J. Goade,
By Spencer B. Prentiss
his Attorney No. 748,857.

Patented January 5, 1904.

UNITED STATES PATENT OFFICE.

RICHARD J. GOADE, OF ALLENTOWN, PENNSYLVANIA.

FILTER.

SPECIFICATION forming part of Letters Patent No. 748,857, dated January 5, 1904.

Application filed August 24, 1903. Serial No. 170,586. (No model.)

*To all whom it may concern:*

Be it known that I, RICHARD J. GOADE, a citizen of the United States, residing at Allentown, in the county of Lehigh and State of Pennsylvania, have invented a new and useful Filter, of which the following is a specification.

My invention relates to granular-bed filters, and is particularly applicable to large machines of this class designed to supply filtered water to an entire dwelling-house or other building. In filters of this class it is sometimes desirable in order to effect more economical and perfect filtration to provide a sectional bed, one compartment of which at least shall contain a filtering medium of coarser material to first remove the impurities in suspension from the water, while another compartment contains a finer filtering medium capable of then removing or rendering harmless the remaining impurities, such as those held in solution. As the coarser medium bed usually becomes filled with impurities more quickly than the other medium, it is desirable to cleanse this portion of the bed more frequently than the finer portion, and the provision of efficient means for effecting this without necessitating the agitation of the finer bed is therefore one of the objects of my invention. In cleansing the granular bed of these filters it has been found that the most thorough washing by a reverse flow of cold water during agitation of the bed is not always sufficient to remove the accumulated impurities, especially when the filter has been some time in use, as germs will collect and multiply and remain among the particles in spite of the washing and agitation. In order to free the bed from such impurities and germs or render them harmless, I provide means for washing and sterilizing the bed by a reverse flow of hot water during agitation, the water being preferably at or near the boiling-point, the pipe connections being so arranged that both bed-sections or only one may be subjected to the cleansing action of either the hot or cold water, and then, after cleansing, either hot or cold filtered (or unfiltered, if desired) water may be regularly supplied to the building. These and further objects and advantages will more fully appear as I proceed with a more detailed description of my improvements, an embodiment of which is illustrated in the accompanying drawings, in which—

Figure 1 is a central vertical section through the filter, the heating apparatus and pipe connections and valves being shown in elevation. Fig. 2 is a view in elevation of the filter looking from left to right in Fig. 1. Fig. 3 is a sectional plan view showing the distributing-nozzle for washing the upper bed; and Fig. 4 is an enlarged detail view, partly in section, showing the agitator-shaft coupling.

Referring to the drawings, A is the shell or casing constituting the filtering-chamber of the same general construction shown in my previous patent, No. 713,759, granted November 18, 1902. According to the present invention, this filtering-chamber is divided into two compartments B C by a foraminous partition, preferably of bronze wire-cloth $b$, supported by a grate $b'$. In this upper compartment B is placed the coarser granular filtering material, composed, preferably, of medium fine quartz-sand resting upon the wire-cloth $b$. In the lower compartment C is placed the finer filtering material, composed, preferably, of pulverized charcoal or bone-black, supported by wire-cloth and grating similar to that of compartment B. In order to agitate the bed in each compartment mechanically, I provide agitators operable from without the casing. The agitator for the lower bed portion is shown as of similar construction to that shown in my patent above referred to and comprising spiral blades $c^2$, mounted upon, so as to rotate with, the shaft $C'$, working in bearings $c^3$ $c^4$, which bearings are carried by grids or spiders $c^5$ $c^6$, respectively. The upper surface of bearing $c^4$ is inclined, as shown, to form a cam-surface for engagement of pin $c^7$ upon the shaft in order to give to the shaft a reciprocatory motion simultaneous with its rotary motion. Agitators $b^2$ are provided for the upper bed-section mounted upon shaft B', working in suitable bearings. The upper end of shaft B' is connected by suitable gearing with an operating-handle D. Shaft $d$, forming part of this connection, is mounted in loose bearings to permit the reciprocatory motion of shaft B', and spring $d'$ bears upon the upper end of shaft B'.

The two shafts B' C' are in alinement and are connected by a coupling E, the peculiar construction of which is shown in Fig. 4. This coupling consists of two members $e\ e'$, fastened, respectively, to the adjacent ends of shafts B' C'. Member $e$ is chambered to receive member $e'$, and the contacting end surfaces of each member are provided with inclined helical faces $e^2$, which when shaft B' is rotated by turning handle D in a forward direction engage like a ratchet and cause shaft C' to turn in the same direction. When handle D is turned in the opposite direction, however, the faces $e^2$ slide upon each other and, shaft C' being held stationary by the granular bed in compartment C, impart a reciprocatory motion to shaft B' simultaneous with its rotary motion.

While the construction of the coupling E described is that which I now prefer to effect the desired purposes, I do not wish to be limited to that particular form, as I may employ other constructions capable of acting as a ratchet connection between the two shafts, which may or may not cause the reciprocatory motion of the upper shaft.

Connected with the upper end of the filtering-chamber is an inlet-pipe F for the water to be filtered, this inlet-pipe being provided with a valve 1. The lower end of the filtering-chamber communicates by pipe G, having valves 2 and 3, with pipe H, which supplies the building with filtered water. Pipe I connects inlet-pipe F with pipe G between valves 2 and 3. The discharge-pipe K communicates with the upper end of the filtering-chamber for carrying off the waste water when washing the filter and is provided with valve 4. The hot-water pipe L, connected between pipes K and G, is provided with a suitable heater M of any suitable construction, in this instance shown as a gas-heater. Valve 5 controls the communication of pipe L with pipe K, and below this valve pipe L is connected by a cross-pipe N with pipe I below valve 6, the pipe N being controlled by valve 7. Below valve 8 a pipe O connects pipe I with a spray-nozzle P, located within the lower compartment of the filtering-chamber immediately below grate $b'$ to supply and evenly distribute a reverse-flow of water for washing the bed of the upper compartment. Valve 9 controls the supply through pipe O, and at the opposite end of the spray-nozzle P a return-pipe Q, having a valve 10, connects with the upper portion of lower compartment C below the spray-nozzle for returning to the bed in this compartment any particles of granular material which may have settled in the spray-nozzle pipe.

The operation of the filter is as follows: For supplying cold filtered water, supposing, first, that all the valves are closed, valves 1, 3, 11, and 2 should be opened. Water will then enter through pipe F, pass downward through the entire filtering-chamber and through pipes G and H to the house-pipes. All the valves being again closed, in order to clean the entire filter-bed—that is, the bed in both compartments—with cold water valves 6, 8, 3, 11, and 4 are opened. Water then enters at pipe F, passes through pipes I and G, through the filter-bed in an upward direction, and out at pipe K, the operating-handle D being turned in a right-hand direction at the same time to revolve both of the agitators. In order to clean the upper bed independent of the lower bed with cold water, all the valves being again closed, valves 6, 9, 8, and 4 are opened, and the operating-handle D is at the same time turned in a reversed direction, thus imparting to the agitator $b^2$ a combined rotary and reciprocatory motion. When it is desired to cleanse the entire filter-bed with hot water for the purpose of sterilizing it, all of the valves being again closed, valves 6, 7, 11, and 4 are opened, the heater M being started and the operating-handle being turned in the opposite direction for agitating the bed in both compartments. Water will then enter at F, flow through pipes I, N, and L, through heater M, and upward through the filtering-chamber to discharge-pipe K. This flow is permitted to continue until the granular material in both beds is thoroughly sterilized. In order to clean the upper portion of the bed contained in compartment B with hot water, all of the valves being again first closed, valves 6, 7, 3, 9, and 4 are opened, when water will enter at pipe F, flow through pipes N L G I O, spray-nozzle P, upward through compartment B, and out at pipe K. Should nozzle P have become clogged with filtering material from the bed in compartment C, valve 10 is also opened to permit flow through pipe Q to carry said material back into compartment C, where it belongs. When it is desired to supply heated filtered water to the house, supposing all the valves again to be closed, valves 1, 11, 7, 8, and 2 are opened, and the heater M started. Water entering at pipe F will then flow downward through the entire filtering-chamber, upward through heater M and pipe L, through pipe N, pipe I, and out through pipe H to the house. Should it be desirable at any time to supply heated unfiltered water to the house when the filter is disabled or for any other reason, valves 6, 7, 3, and 2 are opened, the remaining valve being closed, when water will enter from pipe F, passing through pipes N, L, G, and H, and so to the house.

While I have described in detail certain features of construction in explaining my invention, I do not wish to be limited to the precise forms shown and described, as many modifications and variations may be made in the details without departing from the spirit of the invention, and these I wish it to be understood fall strictly within the scope and purview thereof.

Having described my invention, what I claim as new, and desire to secure by Letters Patent of the United States, is—

1. In a granular-bed filter, a filtering-chamber divided into a plurality of compartments, a foraminous partition between adjacent compartments, a distributing-nozzle in one compartment for supplying a reverse flow to an adjacent compartment through said partition, and an extension from said nozzle communicating with the compartment in which the nozzle is located.

2. In a granular-bed filter, a filtering-chamber divided into a plurality of compartments, a foraminous partition between adjacent compartments, a distributing-nozzle in one compartment, connected to a supply-pipe, for supplying a reverse flow to an adjacent compartment, and a valved return-passage from the portion of said nozzle opposite said supply-pipe to the same compartment.

3. In a granular-bed filter, a filtering-chamber divided into an upper and a lower compartment by a foraminous partition, a distributing-nozzle in said lower compartment for supplying a reverse flow to said upper compartment through said partition, and an extension from said nozzle to said lower compartment for returning granular material from said nozzle to said lower compartment.

4. In a granular-bed filter, a filtering-chamber divided into an upper and a lower compartment by a foraminous partition, and containing granular filtering material in each compartment, a nozzle in said lower compartment for supplying a reverse flow to the filtering material in said upper compartment through said partition, and an extension from said nozzle to said lower compartment for returning granular material from said nozzle to said lower compartment.

5. In a granular-bed filter, a filtering-chamber divided into an upper and a lower compartment by a foraminous partition, a valved supply-pipe connected to the upper end of said filtering-chamber, a heater, a valved hot-water pipe communicating between said supply-pipe through said heater with the lower end of said filtering-chamber, and a pipe connection from said hot-water pipe for supplying a reverse flow to said upper compartment through said foraminous partition.

6. In a granular-bed filter, a filtering-chamber divided into an upper and a lower compartment by a foraminous partition, a supply-pipe connected to the upper end of said filtering-chamber, a valved discharge-pipe at the lower end of said chamber, a valved down-pipe connecting said supply and discharge pipes, a heater, a valved hot-water pipe communicating between said down-pipe through said heater with the lower end of said filtering-chamber, and a valved communication between said down-pipe and the lower end of said upper compartment through said foraminous partition.

7. An improved agitating apparatus for granular-bed filters, comprising two axial shafts in alinement each provided with an agitator, means for rotating one of said shafts, and a ratchet connection between the shafts.

8. An improved agitating apparatus for granular-bed filters comprising a plurality of agitating members, and a connection between said members so constructed that when one member is rotated in a given direction the adjacent member will be rotated, and when rotated in the opposite direction said adjacent member will remain stationary.

9. An improved agitating apparatus for granular-bed filters, comprising two axial shafts in alinement, agitators mounted upon each shaft, means for rotating one of said shafts, and a connection between the shafts constructed to clutch the second shaft when the first shaft is turned in one direction and to slip when the direction of rotation of the first shaft is reversed.

10. An improved agitating apparatus for granular-bed filters, comprising two axial shafts in alinement, agitators mounted upon each shaft, means for rotating one of said shafts, and an inclined-surface connection between said shafts for imparting to the rotated shaft a combined rotary and reciprocatory motion independent of the other shaft.

11. An improved agitating apparatus for granular-bed filters, comprising two axial shafts in alinement, agitators mounted upon each shaft, means for rotating one of said shafts, and an inclined-surface ratchet connection between said shafts whereby when the rotating means is actuated in one direction both shafts are rotated simultaneously, and when in the opposite direction a combined rotary and reciprocatory motion is imparted to the first shaft.

12. In a granular-bed filter, a filtering-chamber divided into an upper and a lower compartment, an axial shaft carrying agitators mounted in each compartment, means for rotating one of said shafts, and a ratchet connection between the shafts.

In testimony whereof I have signed my name to this specification in the presence of two subscribing witnesses.

RICHARD J. GOADE.

Witnesses:
STEPHEN P. KEUNE,
WALTER J. SAEGER.